(12) United States Patent  
Fang

(10) Patent No.: US 8,081,756 B2
(45) Date of Patent: Dec. 20, 2011

(54) IMPLEMENTATION OF MEDIA-PROTECTION POLICIES

(75) Inventor: Nicholas J. Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1600 days.

(21) Appl. No.: 11/235,473

(22) Filed: Sep. 26, 2005

(65) Prior Publication Data

US 2007/0071239 A1    Mar. 29, 2007

(51) Int. Cl.
*H04N 7/167* (2011.01)
(52) U.S. Cl. ............................................. 380/228
(58) Field of Classification Search .......... 380/228, 380/221, 45; 726/1; 725/25, 29, 31, 116
See application file for complete search history.

(56) References Cited

U.S. PATENT DOCUMENTS

| 6,055,314 A * | 4/2000 | Spies et al. ................. 380/228 |
| 7,299,209 B2 * | 11/2007 | Collier ........................... 705/59 |
| 2002/0136406 A1 * | 9/2002 | Fitzhardinge et al. ....... 380/210 |
| 2003/0078795 A1 * | 4/2003 | Collier ............................ 705/1 |

* cited by examiner

*Primary Examiner* — Ellen Tran

(57) ABSTRACT

A technique wherein a first electronic device, such as a server, provides to a second electronic device, such as a client device, a first portion of a digital-content stream. The first electronic device receives an identifier of a protection policy to be applied to the digital-content stream. The first electronic device provides to the second electronic device a data set that includes the policy and a key. In an embodiment, the data set is provided concurrently with providing the digital-content stream to the second electronic device. The first electronic device provides to the second electronic device a second portion of the digital-content stream that is encrypted using the key.

20 Claims, 5 Drawing Sheets

IMPLEMENTATION OF MEDIA-PROTECTION POLICIES

BACKGROUND

Digital rights management (DRM) is an extremely important consideration in connection with the ever-growing distribution of digital content, such as digital audio, digital video, digital text, digital data, digital multimedia, etc. Typically, the owner of rights in the digital content desires to distribute such content to a user or recipient in exchange for a license fee or some other consideration. The owner may further desire to restrict what the user can do with such distributed digital content. For example, the owner may desire to restrict the user from copying and re-distributing such content to a second user, at least in a manner that denies the content owner a license fee from such second user.

In certain situations, a digital-content recipient may desire to communicate the content from one electronic device to another. For example, a recipient may desire to receive digital content at a server and pass the content along to a client device that, in turn, is operable to render the content to a presentation device, such as a television, stereo system or the like. It is often further desirable, for DRM purposes, to ensure that the client device outputs the content to the presentation device in accordance with a set of rules, such as a protection policy, associated with the content. Such protection policies may be in accordance with, for example, the CGMS-A and Macrovision DRM standards, and the like. To this end, the server may transmit the protection policy along with the content to the client device, thereby allowing the client device to process and implement the protection policy in conjunction with rendering the content. Moreover, the server may encrypt the content with a key and provide the key to the client device for content decryption subject to the ability of the client device to implement the protection policy.

Among the different types of restricted-use media that can be provided by a server to a client device, television and other long-playing data streams are unusual in that they may not be associated with a single fixed protection policy. During the course of a restricted-use television-streaming session, the protection policy can change as certain restrictions are applied or removed. A change in policy may be necessitated by, for example, a transition from one program to another or a transition from one channel to another. A problem associated with such changes in policy is the need to process the new policy and an associated key to accommodate the new policy, thereby causing the viewer of the television stream to encounter unwanted delays in viewing content subject to the new policy.

SUMMARY

This Summary is provided to generally introduce, in a simplified form, the reader to one or more select concepts described below in the Detailed Description. This Summary is not intended to identify key and/or required features of the claimed subject matter, nor is it intended to be used as an aid in determining the scope of the claimed subject matter.

Embodiments provide a technique wherein a first electronic device, such as a server, provides to a second electronic device, such as a client device, a first portion of a digital-content stream, such as a video and/or audio stream. The first electronic device receives an identifier of a protection policy to be applied to the digital-content stream. The first electronic device provides to the second electronic device a data set that includes the policy and a key. The first electronic device provides to the second electronic device a second portion of the digital-content stream that is encrypted using the key.

Embodiments further provide a technique wherein a first protection policy is applied to a first portion of a data stream, such as, for example, a video and/or audio stream. Decryption of the first portion is enabled using a first key. At a first time, the protected and decrypted first portion is output to a presentation device, such as, for example, a television or stereo receiver. Subsequent to the first time, a second protection policy is applied to a second portion of the data stream, and decryption of the second portion is enabled using a second key. At a second time subsequent to the first time, the protected and decrypted second portion is output to the presentation device. The protected and decrypted data stream is continuously output to the presentation device from the first time to the second time.

DETAILED DESCRIPTION

Figure 1:
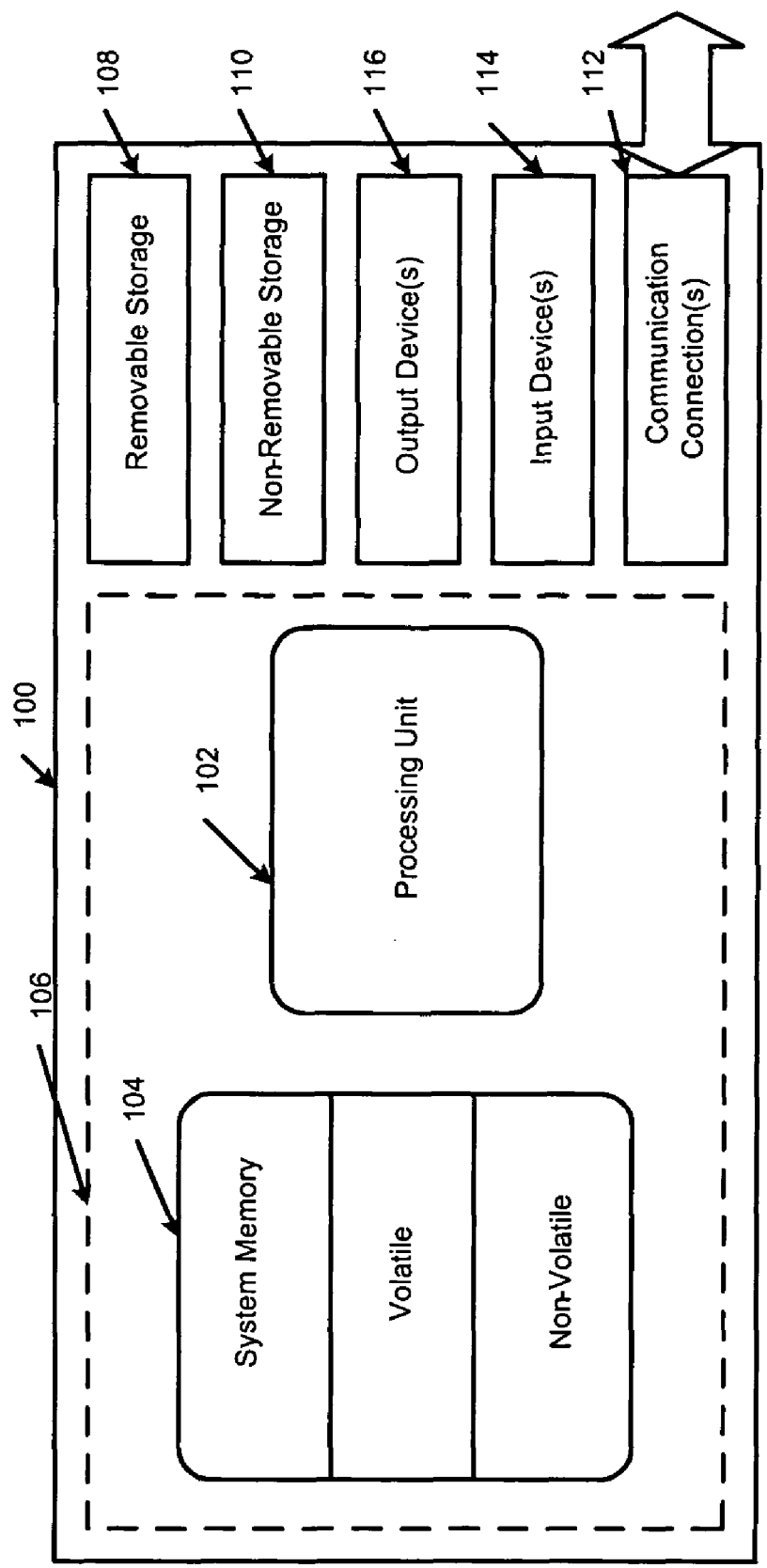
FIG. 1 is a schematic diagram of an illustrative computing-system environment in which embodiments of the invention may be implemented.

Generally described herein, among other things, are techniques implementable in a computer network coupled to at least one presentation device, such as, for example, a display and/or audio speakers. Such a computer network may be implemented as, for example, a home or other local-area network wherein a centralized media server, such as a personal computer (PC), receives media content and distributes the media content to one or more client devices on the network. Such client devices may include electronic home-remote media devices, digital media rendering devices, DVRs, set-top boxes, video-gaming devices, pocket PCs, portable DVD devices, and the like. The techniques allow application of at least one content-protection policy to a long-playing data stream, such as, for example, a video or audio stream, that is rendered by the presentation device. The techniques further allow application of the policy in a manner causing, from the standpoint of a user of the presentation device, little or no perceivable disruption of the rendered stream.

In an embodiment, a first computing device, such as a server, provides a data stream to a second computing device, such as a client. The client is operable to buffer, render and output to a presentation device the data stream. The server receives an identifier of a protection policy to be applied by the client to the data stream. In response, the server generates a license that includes the protection policy and a key. Subsequently, the server provides the license to the client via a signal different from the signal carrying the data stream. The server then encrypts the data stream using the key and provides the encrypted data stream to the client. As such, because the client receives the license via a signal different from that carrying the data stream, the client has time to parse and implement the policy and key prior to receiving the encrypted data stream. Additionally, because the protection policy and key are bundled into a single data set (license), the protection policy cannot be maliciously discarded without discarding the key by which the stream can be decrypted. Moreover, because the client outputs a buffered portion of the data stream during parsing and implementation of the policy and key, the output of the client appears continuous to a user of the presentation device.

Embodiments of the invention are operational with numerous general purpose or special purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc., that perform particular tasks or implement particular abstract data types. Embodiments of the invention may also be practiced in distributed-computing environments where tasks are performed by remote processing devices that are linked through a communications network. In a distributed-computing environment, program modules may be located in both local and remote computer-storage media including memory-storage devices.

Embodiments within the scope of the present invention also include computer-readable media for carrying or having computer-executable instructions or data structures stored thereon. Such computer-readable media can be any available media that is accessible by a general-purpose or special-purpose computer or other electronic device. By way of example, and not limitation, such computer-readable media can include physical storage media such as RAM, ROM, EEPROM, CD-ROM or other optical disk storage, magnetic disk storage or other magnetic storage devices, or any other medium that can carry or store program code means.

With reference to FIG. 1, an exemplary system for implementing one or more embodiments of the invention includes a computing device, such as computing device 100. In its most basic configuration, computing device 100 typically includes at least one processing unit 102 and system memory 104. The device 100 is only one example of a suitable computing environment and is not intended to suggest any limitation as to the scope of use or functionality of embodiments of the invention. Nor should the device 100 be interpreted as having any dependency or requirement relating to any one or combination of components of the device 100.

Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer-storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer-storage media. Computer-storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer-storage media may be part of device 100.

Device 100 may also contain communications connection(s) 112 that allow the device to communicate with other devices. As such, communications connection(s) 112 may allow device 100 to receive from and/or provide to other devices media programs. Media programs may include audio and video media such as broadcast television programs, cable television programs, pay-per-view programs, video-on-demand (VOD) programs, near video-on-demand (NVOD) programs, available-on-demand applications (e.g., on-demand interactive games), music, promotional material, or any other type of deliverable media. In the described exemplary implementations, the media programs may be associated with traditional broadcast channels (which are tuned by frequency), with IPTV broadcast channels (which are tuned by universal resource locator (URL)), and/or with any other types of channels over which media content may be transmitted. The media programs may have associated therewith media data, which may include metadata, identifiers, URLs, interactive media application control information, program guide information (e.g., program guide listings data, pay-per-view ordering information, program promotional information, or any other suitable program guide information) or any other deliverable data.

Communications connection(s) 112 is an example of communication media. Communication media typically embodies computer-readable instructions, data structures, program modules or other data in a modulated data signal such as a carrier wave or other transport mechanism and includes any information-delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared (IR) and other wireless media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length herein.

Figure 2:
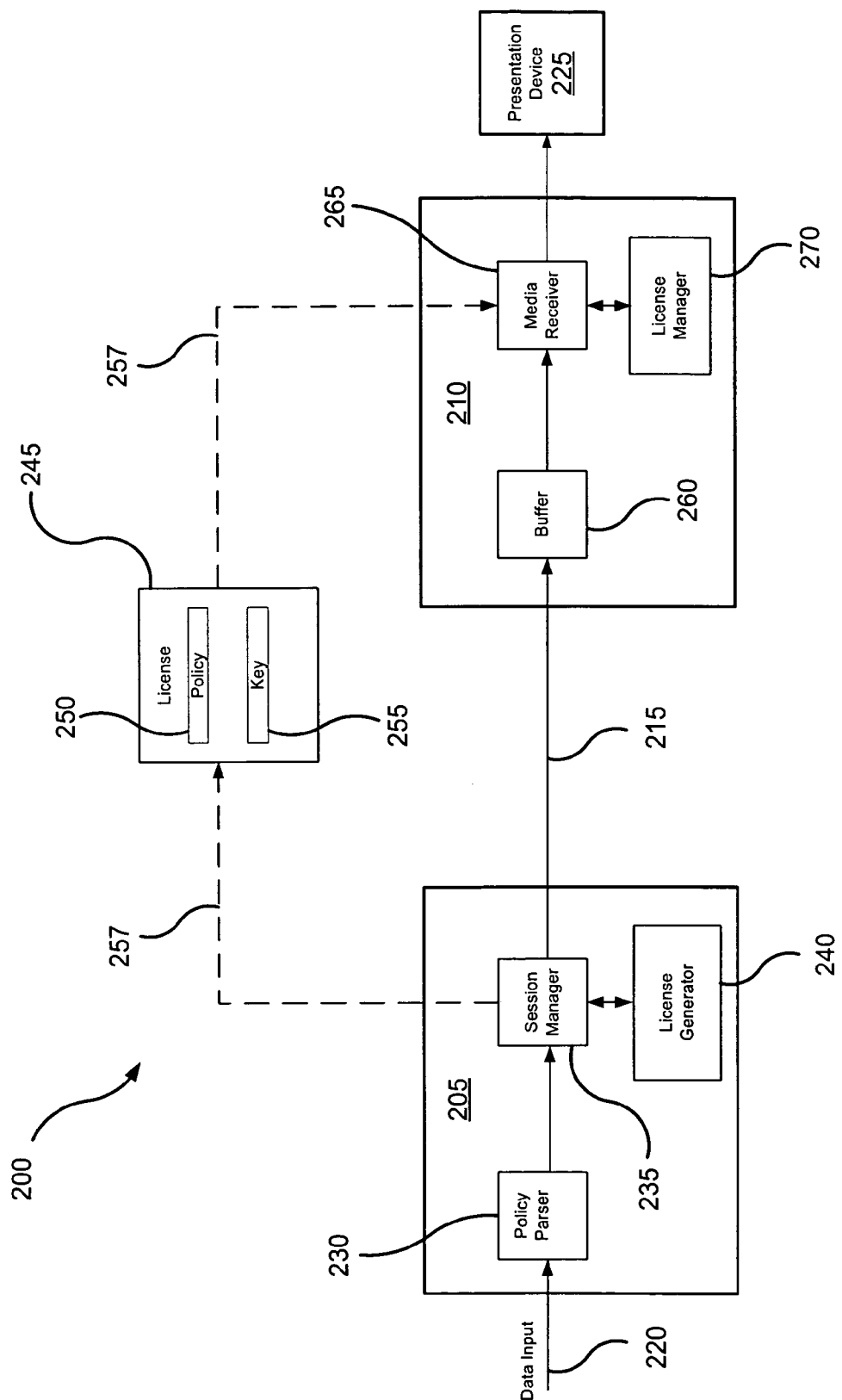
FIG. 2 is a functional block diagram illustrating features of an embodiment of the invention.

FIG. 2 is a functional block diagram illustrating features of an embodiment of the present invention. In the illustrated embodiment, a network 200 includes a server device 205 and a client device 210. Each of the client device 210 and server device 205 may be configured as, and include some or all of the components of, the device 100 illustrated in FIG. 1. The server device 205 and client device 210 are coupled by a communication medium 215. The communication medium 215 may include a wireless or wired medium. Moreover, the communication medium 215 may include one or more computing devices (not shown) and, as such, the server device 205 and client device 210 may communicate with each other over one or more wide-area networks (WANs) or local-area networks (LANs).

The server device 205 receives data via a data input 220 that may be coupled to one or more communication connections 112 of the server device. Alternatively the data input 220 may be coupled to one or more memory or storage devices of, or accessible to, the server device 205. The data input 220 may include any signal-carrying wire, such as, for example, a coaxial-cable connection, or may include a wireless transmission medium, such as RF or IR signals. The client device 210 is coupled to a presentation device 225 that may include a television, a computer system with monitor and speakers, a stereo system, any other suitable presentation device, or any combination thereof. Although the network 200 is illustrated in FIG. 2 as including only one client device 210, it should be understood that the network may include more than one such or similar client device coupled to the server device 205.

In an embodiment, the server device 205 includes a policy parser 230, a session manager 235 and a license generator 240, each of which may be implemented in any suitable software, firmware, hardware or combination(s) thereof. The policy parser 230 is operable to receive, via the data input 220, a digital-data stream, such as an encoded television-content stream. Alternatively, the policy parser 230 may receive the stream from one or more memory or storage devices of, or accessible to, the server device 205. The data stream may be configured to include media data in the form of one or more policy identifiers identifying one or more protection policies that the network 200 is to enforce with respect to storing the streamed data and/or outputting the rendered data stream to a presentation device. The policy parser 230 is further operable to monitor the data stream and detect policy identifiers.

Upon detecting an identifier, the policy parser 230 informs the session manager 235 that application of an associated policy is to be initiated and provides the policy identifier and data stream to the session manager. The session manager 235, in turn, provides the policy identifier to the license generator 240. The license generator 240 is operable to determine the policy associated with the identifier by, for example, consulting a database (not shown) that is populated with a set of recognized identifiers cross-referenced to respective associated protection policies. The license generator 240 is further operable to create and provide to the session manager 235 a license data set 245 that includes a definition of the identified protection policy 250 and an encryption key 255. The session manager 235 then provides the license 245 to the client device 210 via the communication medium 215. As indicated by the dashed lines 257, the session manager 235 may provide the license 245 to the client device 210 via a signal separate from (i.e., out of band with respect to) the data stream. In an alternative embodiment, the dashed lines 257 may represent a communication medium, additional to the communication medium 215, over which the license 245 is provided to the client device 210. The license generator 240 is further operable to encrypt the data stream with the key 255, thereby allowing the session manager 235 to provide an encrypted form of the data stream to the client device 210 via the communication medium 215.

In an embodiment, the client device 210 includes a buffer 260, a media receiver 265 and a license manager 270, each of which may be implemented in any suitable software, firmware, hardware or combination(s) thereof. The media receiver 265 is operable to receive the license 245 from the server and provide the license to the license manager 270. The license manager 270 is operable to parse the policy 250 and key 255 from the license 245. If the license manager 270 recognizes the policy 250, the license manager informs the media receiver 265 of the associated protection measures to be applied to the data stream. Subsequently, the media receiver 265 generates and provides to the session manager 235, via one of communication media 215, 257, a signal informing the session manager that the client device 210 is enabled to enforce the identified protection policy 250. If the license manager 270 fails to recognize the policy 250, the media receiver 265 may generate and provide to the session manager 235 a signal informing the session manager that the client device 210 is unable to enforce the identified protection policy.

Upon receiving the validation signal from the client device 210, the session manager 235 commences streaming of the encrypted data stream to the buffer 260. Subsequently, the license manager 270 decrypts the buffered data stream with the key 255. The media receiver 265 applies to the stream the protections associated with the identified protection policy 250, renders the decrypted stream, and outputs the rendered stream to the presentation device 225.

In operation, according to an embodiment of the invention, a user of the network 200 may wish to begin a policy-protected-content streaming session that provides the rendered content to the presentation device 225. As such, through appropriate actions, the user may cause the server device 205 to initiate the session by receiving or generating a content stream that includes a first-protection-policy identifier associated with a first protection policy. This first-protection-policy identifier may be included in the stream to cause the network 200 to apply the first protection policy to a first portion of the stream, such as, for example, a first television program. The policy parser 230 detects the first-protection-policy identifier and provides this identifier to the session manager 235. The session manager 235 provides the first-protection-policy identifier to the license generator 240 and receives from the license generator a first license including the first-protection-policy definition and a first encryption key. Subsequently, the session manager 235 provides the first license to the client via one or more of the communication media 215, 257.

After receiving confirmation from the client device 210 that the client device is enabled to enforce the first protection policy, the license generator 240 begins encrypting the first portion of the content stream with the first key and the session manager 235 provides to the buffer 260, via the communication medium 215, the encrypted content stream. After the buffer 260 has filled, the license manager 270 decrypts the content stream using the first key. The media receiver 265 applies to the stream the protections associated with the first protection policy, renders the decrypted stream, and outputs the rendered stream to the presentation device 225.

At some point during the data-streaming session, it may become necessary to change the protection policy applied to the stream. This modification may be required due to, for example, a transition from a first program to a second program (either in response to a channel change or conclusion of the first program), each of which requires a respective different protection level. As such, a policy identifier in the data stream may serve not only to indicate the protection policy to be applied, but also the portion of the stream to which the policy is to be applied (e.g., the point at which the new or second program begins).

Consequently, at a time subsequent to initiation of the streaming session, the policy parser 230 detects in the content stream a second-protection-policy identifier indicating that a forthcoming second portion of the stream requires application of a second protection policy. The policy parser 230 then provides this second-protection-policy identifier to the session manager 235. The session manager 235 provides the second-protection-policy identifier to the license generator 240 and receives from the license generator a second license including the second-protection-policy definition and a second encryption key. Subsequently, the session manager 235 provides the second license to the client device 210 via one of communication media 215, 257. In an embodiment, the second license is provided to the client device 210 out of band with respect to (i.e., not embedded in) the content stream, thereby better ensuring that the arrival and parsing of the second license at the client device 210 precedes the arrival at the client device 210 of the content-stream second portion.

In an embodiment, upon providing the second license to the client device 210, the session manager 235 temporarily discontinues providing the content stream to the client device 210. However, the client device 210, by outputting to the presentation device 225 a portion of the content stream remaining in the buffer 260, ensures that a user of the presentation device does not perceive any discontinuity in the stream. After receiving confirmation from the client device 210 that the client device 210 is enabled to enforce the second protection policy, the license generator 240 begins encrypting the content-stream second portion with the second key. The session manager 235, in turn, provides to the buffer 260, via the communication medium 215, the encrypted content-stream second portion. In an embodiment, the session manager 235 is operable to insert into the stream an indicator, such as, for example, a data packet, indicating the commencement point of the content-stream second portion and that the second license must be employed with respect to the content-stream second portion. Alternatively, this indicator may be included in the second license.

In turn, the media receiver 265 is operable to detect the indicator and inform the license manager 270 of the second-portion commencement point. As such, at the appropriate time, the license manager 270 begins decrypting the content-stream second portion using the second key. The media receiver 265 applies the protections associated with the second protection policy to the content-stream second portion, renders the decrypted content-stream second portion, and outputs the rendered content-stream second portion to the presentation device 225.

The buffer 260 may be fully replenished by accelerating the rate at which the session manager 235 provides the content stream to the buffer. Alternatively, the media receiver 265 may reduce the rate at which the stream is output to the presentation device 225.

Figure 3:
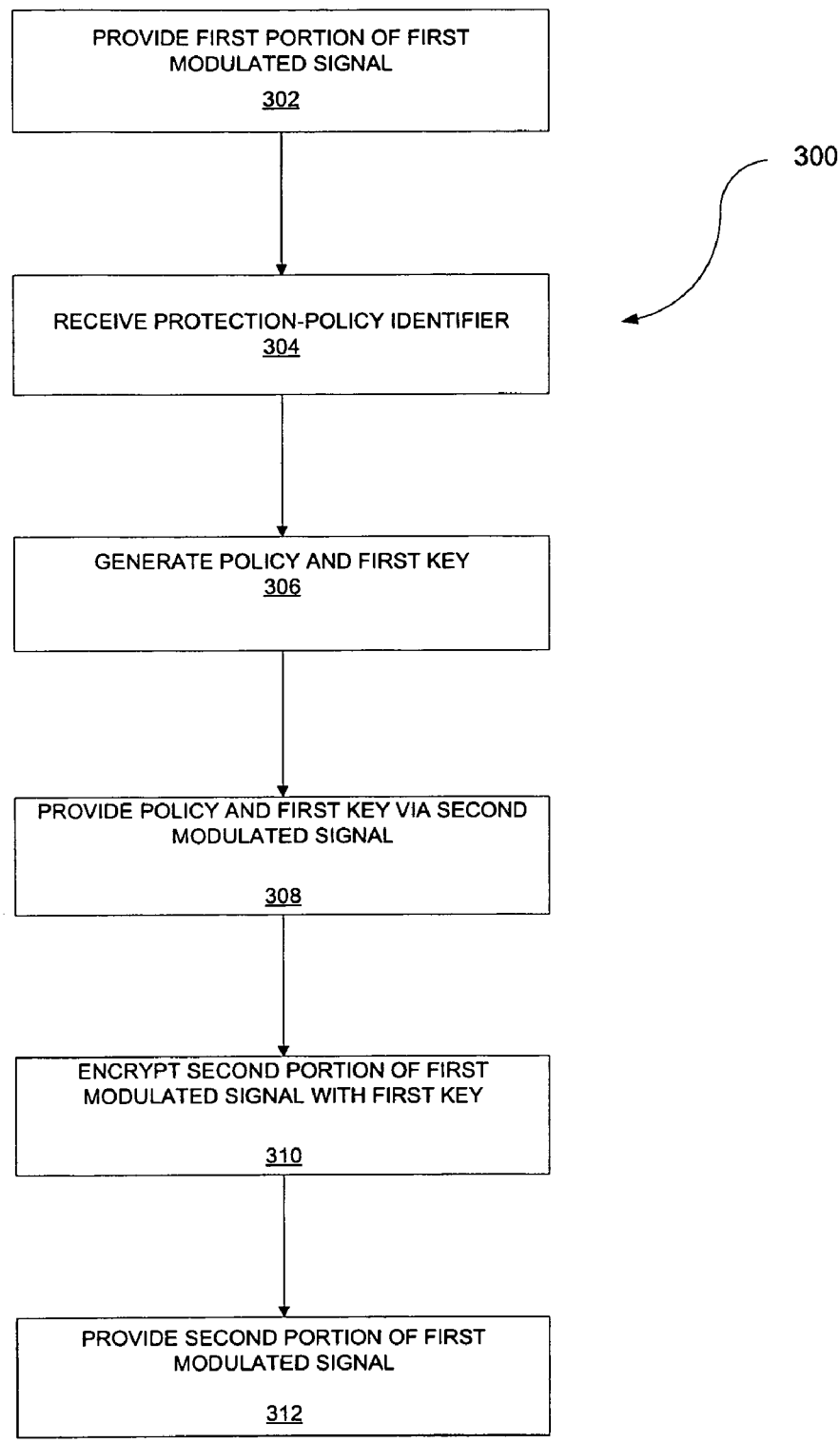
FIG. 3 is a flow diagram of a computer-executable method according to an embodiment of the invention.

FIG. 3 illustrates a server-implemented process 300 for providing protected digital content to a client device according to an embodiment of the invention. The process 300 is illustrated as a set of operations shown as discrete blocks. The process 300 may be implemented in any suitable hardware, software, firmware, or combination thereof. The order in which the operations are described is not to be necessarily construed as a limitation.

At a block 302, a first electronic device, such as the server device 205, provides to a second electronic device, such as the client device 210, a first portion of a first modulated signal to be output to a presentation device, such as a display and/or audio speakers. For example, the first modulated signal may comprise a digital-content stream, such as a video stream. The first modulated signal may be transmitted from the server device 205 to the client device 210 via, for example, the communication medium 215. As such, the first modulated signal may comprise a wireless or wired signal. In an embodiment, the first portion is encrypted using a key different from the first key discussed herein with reference to FIG. 3.

At a block 304, a component of the server device 205 receives an identifier of a protection policy to be applied to the first modulated signal. In an embodiment, the identifier is received via the data input 220 from a third electronic device external to the server device 205. Alternatively, the identifier is received from one or more memory or storage devices of, or accessible to, the server device 205.

At a block 306, the server device 205 generates a data set, such as a license, including the policy and a first key. For example, as discussed elsewhere herein, after receiving the identifier, the session manager 235 receives from the license generator 240 a license data set that includes a definition of the identified protection policy and an encryption key.

At a block 308, the server device 205 provides to the client device 210 a second modulated signal including the data set. For example, after the license generator 240 has generated the license including the policy and the first key, the server device 205 provides the license to the client device 210 via a wired or wireless signal different from the signal carrying the content stream. In an embodiment, the server device 205 provides to the client device 210 the data set and first modulated signal in parallel (i.e., by separate, simultaneously transmitted signals). In this manner, transmission of the data set and first modulated signal to the client device 210 may be concurrent.

At a block 310, the server device 205 encrypts a second portion of the first modulated signal with the first key.

At a block 312, the server device 205 provides the encrypted second portion of the first modulated signal to the client device 210, after which the client device may decrypt the second portion using the first key and output the second portion to the presentation device. Advantageously, the policy and key can be processed by the client device 210 prior to receipt by the client device 210 of the second portion, Consequently, a user of the presentation device observes no lapse in output of the first modulated signal as the client device 210 transitions from outputting the first portion to outputting the second portion.

Figure 4:
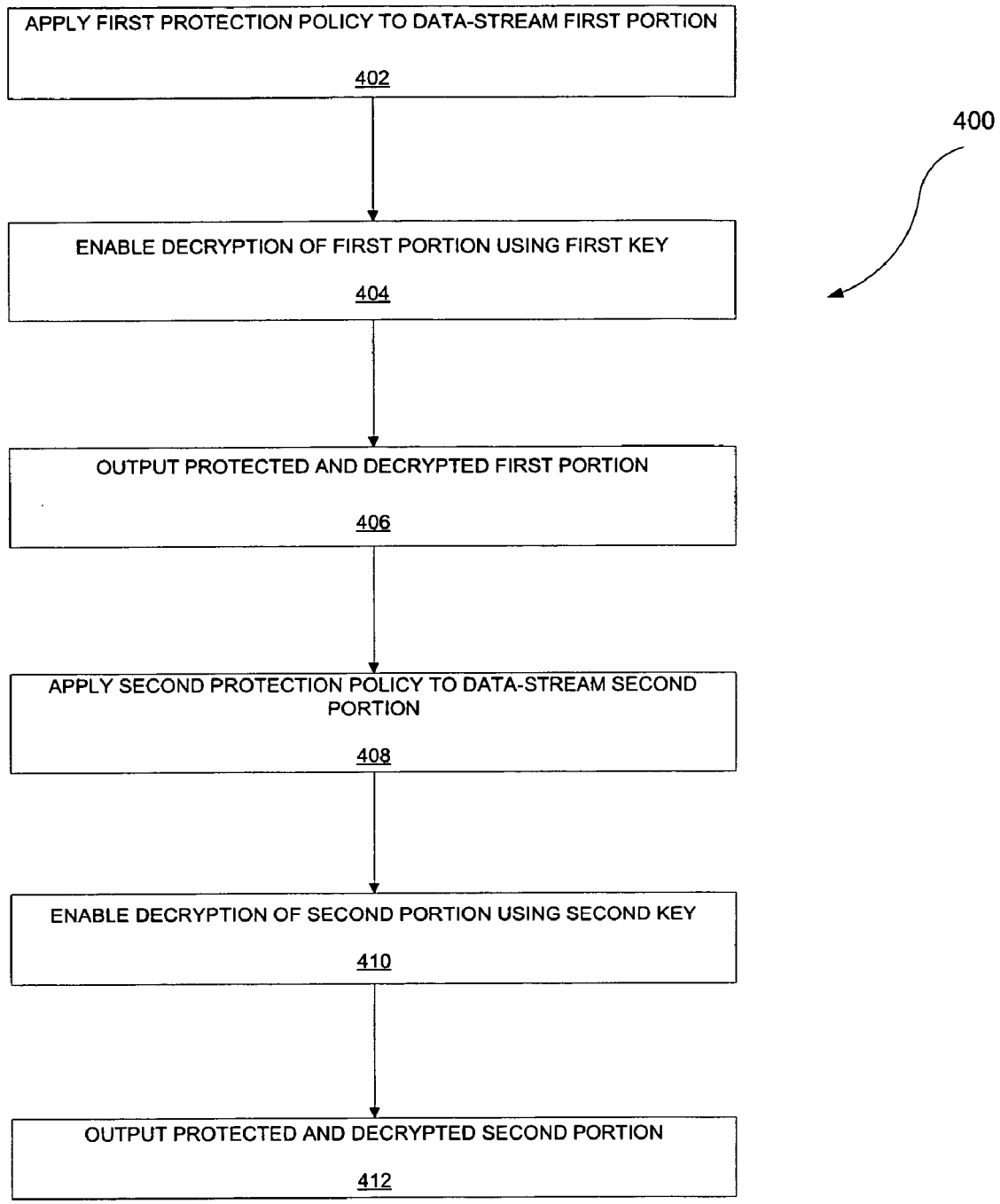
FIG. 4 is a flow diagram of a computer-executable method according to an alternative embodiment of the invention.

FIG. 4 illustrates a client-implemented process 400 for outputting protected digital content to a presentation device according to an embodiment of the invention. The process 400 is illustrated as a set of operations shown as discrete blocks. The process 400 may be implemented in any suitable hardware, software, firmware, or combination thereof. The order in which the operations are described is not to be necessarily construed as a limitation.

At a block 402, a device, such as the media receiver 265, applies a first protection policy to a first portion of a data stream. In an embodiment, the data stream comprises a content stream, such as a video stream. The data stream may, for example, be received from the server device 205.

At a block 404, the media receiver 265 enables decryption of the first portion using a first key. For example, the media receiver 265 is operable to provide the first key, which may be received from the server device 205, to the license manager 270. The license manager 270, in turn, is operable to decrypt the first portion using the first key.

At a block 406, the media receiver 265, at a first time, outputs the protected and decrypted first portion to the presentation device 225.

At a block 408, the media receiver 265, subsequent to the first time, applies a second protection policy to a second portion of the data stream. This second protection policy, as well as the second portion, may be received by the media receiver 265 from, for example, the server device 205.

At a block 410, the media receiver 265, subsequent to the first time, enables decryption of the second portion of the data stream using a second key. For example, the media receiver 265 is operable to provide the second key, which may be received from the server device 205 bundled in a license with the second protection policy, to the license manager 270. The license manager 270, in turn, is operable to decrypt the second portion using the second key.

Alternatively, the media receiver 265 may receive from the server device 205 a policy identifier (as described elsewhere herein) in lieu of a license (i.e., the server device 205 does not generate a license). In such an embodiment, the license manager 270 is operable to determine the policy associated with the identifier by, for example, consulting a database (not shown) that is populated with a set of recognized identifiers cross-referenced to respective associated protection policies and keys. Upon recognition of the identified policy, the license manager 270 may inform the media receiver 265 of the associated protection measures to be applied to the data stream and access the required key. As such, the second protection policy and second key may be received by or otherwise be present at the media receiver 265 prior to the media receiver's access to the second portion.

At a block 412, the media receiver 265, at a second time subsequent to the first time, outputs to the presentation device 225 the protected and decrypted second portion. Advantageously, the protected and decrypted data stream, including both first and second portions thereof, is continuously output to the presentation device 225 (i.e., with no breaks in the stream perceptible to a user of the presentation device) from the first time to at least the second time. Moreover, this continuous output of the protected and decrypted data stream may be at a substantially continuous rate. This feature may be enabled by virtue of the second protection policy and second key being received by or otherwise present at the media receiver 265 prior to the media receiver's access to the second portion. As such, the client device 210 is prepared to decrypt the second portion by the time of its arrival at the client device 210.

Figure 5:
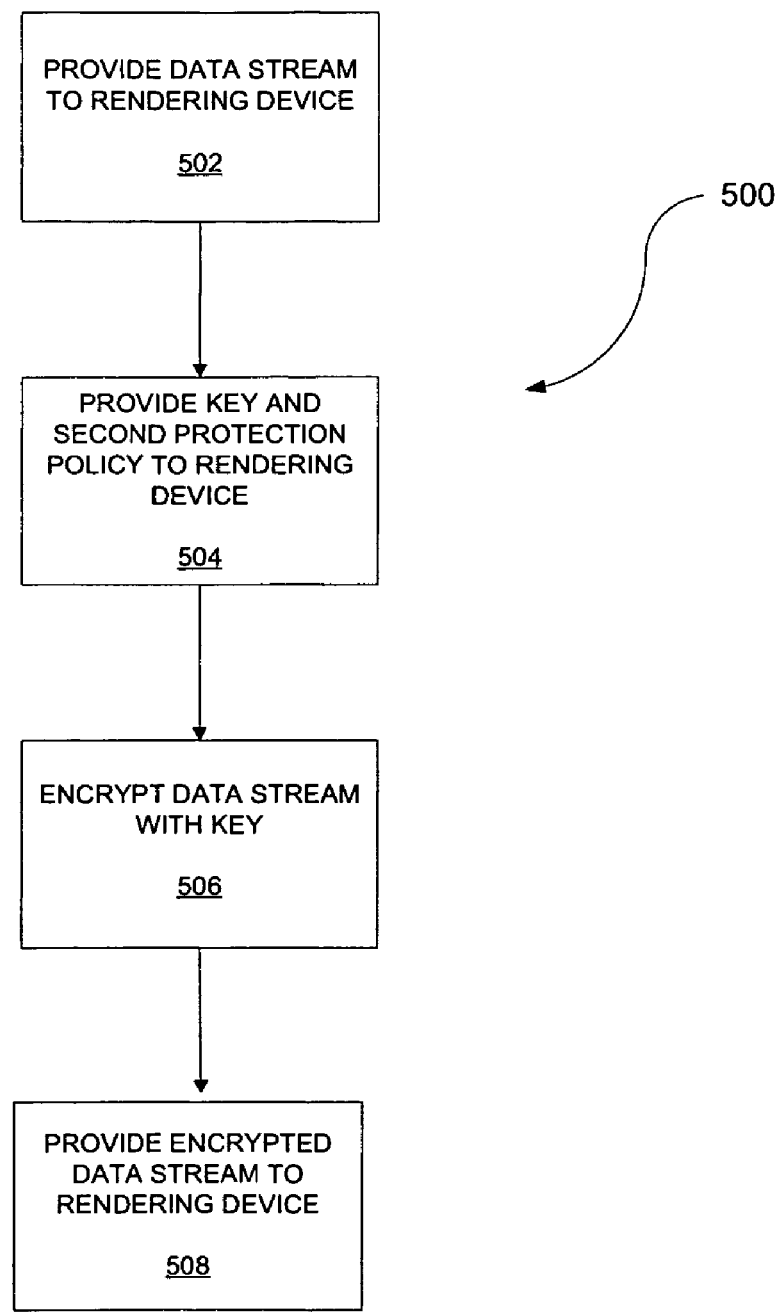
FIG. 5 is a flow diagram of a method according to an alternative embodiment of the invention.

FIG. 5 illustrates a process 500 for providing protected digital content to a rendering device according to an embodiment of the invention. The process 500 is illustrated as a set of operations shown as discrete blocks. The process 500 may be implemented in any suitable hardware, software, firmware, or combination thereof. The order in which the operations are described is not to be necessarily construed as a limitation.

At a block 502, a system, such as the server device 205, provides a data stream to a rendering device, such as the client device 210. The data stream may comprise a content stream, such as a video stream. The data stream may be transmitted from the server device 205 to the client device 210 via, for example, the communication medium 215. In an embodiment, the client device 210 renders a first portion of the data stream in accordance with a first protection policy.

At a block 504, the server device 205 provides a data set, such as a license, including a key and a second protection policy to the client device 210. The second protection policy may be determined in response to a component of the server device 205 receiving an identifier of the second protection policy. In an embodiment, the identifier is received via the data input 220 from an electronic device external to the server device 205. Alternatively, the identifier is received from one or more memory or storage devices of, or accessible to, the server device 205. The purpose of the second protection policy is to enable the client device 210 to render a second portion of the data stream according to the second protection policy. The license may be provided via a signal separate from (i.e., out of band with respect to) the data stream or may be embedded in the data stream.

At a block 506, the server device 205 encrypts the data stream with the key.

At a block 508, the server device 205 provides the encrypted second portion of the data stream to the client device 210.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium that does not consist of a signal, the computer-readable storage medium storing computer-executable instructions for performing steps comprising:

receiving, at a media server device, a digital-content stream to be provided to a client device for rendering the digital-content stream;

providing a first portion of the digital-content stream from the media server device to a buffer of the client device for buffering the first portion of the digital-content stream;

receiving, at the media server device, an identifier indicating that a digital rights management protection policy is to be applied to a forthcoming second portion of the digital-content stream that is to be provided to the client device for restricting redistribution of the second portion of the digital-content stream;

creating, at the media server device, a license data set including the digital rights management protection policy and a first key for enabling decryption of the second portion of the digital-content stream;

transmitting, from the media server device to the client device, the license data set and an indicator indicating a commencement point of the digital-content stream at which the license data set is to be employed, the license data set being transmitted from the media server device in a separate communication out of band with respect to the digital-content stream concurrently with providing the first portion of the digital-content stream to the client device and preceding transmission of the second portion of the digital-content stream from the media server device to the client device;

receiving, at the media server device, confirmation from the client device that the client device is enabled to enforce the digital rights management protection policy for the second portion of the digital-content stream;

encrypting, at the media server device, the second portion of the digital-content stream using the first key; and providing the encrypted second portion of the digital-content stream from the media server device to the buffer of the client device while at least some of the first portion of the digital-content stream is remaining in the buffer of the client device.

2. The computer-readable storage medium of claim 1 wherein the digital-content stream comprises a video stream.

3. The computer-readable storage medium of claim 1 wherein at least one of the digital-content stream and the license data set is transmitted from the media server device to the client device via a wireless signal.

4. The computer-readable storage medium of claim 1 wherein the first portion is encrypted by the media server device using a second key.

5. The computer-readable storage medium of claim 1 having further computer-executable instructions for detecting a change from a digital rights management protection policy associated with the first portion of the digital-content stream to the digital rights management protection policy associated with the second portion of the digital-content stream.

6. The computer-readable storage medium of claim 1 wherein the license data set includes the indicator.

7. The computer-readable storage medium of claim 1 wherein the client device is coupled to the media server device within a local-area network.

8. The computer-readable storage medium of claim 1 wherein the digital-content stream comprises a television digital-content stream, and the identifier received at the media server device is included in the television-content stream.

9. A computer-readable storage medium that does not consist of a signal, the computer-readable storage medium storing computer-executable instructions for performing steps comprising:
receiving, at a buffer of a client device, a first portion of a digital-content stream provided from a media server device;
applying, at the client device, a first digital rights management protection policy to a the first portion of the buffered digital-content stream;
decrypting the first portion of the buffered digital-content stream using a first key;
outputting, at the client device at a first time, the protected and decrypted first portion from the buffer of the client device;
preceding arrival at the client device of a forthcoming second portion of the digital-content stream to be provided from the media server device, receiving a license data set and an indicator indicating a commencement point of the digital-content stream at which the license data set is to be employed from the media server device, wherein:
the license data set includes a second digital rights management protection policy for restricting redistribution of the second portion of the digital-content stream and a second key for decrypting the second portion of the digital-content stream, and
the license data set is received at the client device in a separate communication transmitted by the media server device out of band with respect to the digital-content stream concurrently with the first portion of the digital-content stream and preceding transmission of the second portion of the digital-content stream from the media server device to the client device;
sending, from the client device to the media server device, confirmation that the client device is enabled to enforce the second digital rights management protection policy for the second portion of the digital-content stream;
receiving, at the buffer of the client device, the second portion of the digital-content stream encrypted by the media server device using the second key while at least some of the first portion of the buffered digital-content stream is remaining in the buffer of the client device;
during the outputting of the protected and decrypted first portion from the buffer of the client device, applying the second digital rights management protection policy to the second portion of the buffered digital-content stream;
during the outputting of the protected and decrypted first portion from the buffer of the client device, decrypting the second portion of the buffered digital-content stream using the second key; and
outputting, at the client device at a second time subsequent to the first time, the protected and decrypted second portion from the buffer of the client device, wherein the protected and decrypted first portion of the digital-content stream is continuously output at the client device from the first time to at least the second time.

10. The computer-readable storage medium of claim 9 wherein the first and second portions comprise first and second television programs of a television digital-content stream.

11. The computer-readable storage medium of claim 9 wherein the protected and decrypted first portion of the data stream is output to the presentation device at a substantially continuous rate from the first time to the second time.

12. The computer-readable storage medium of claim 9 having further computer-executable instructions for performing the step of receiving a license data set comprising the first digital rights management protection policy and the first key for decrypting the first portion of the digital-content stream.

13. The computer-readable storage medium of claim 12 wherein the license data set comprising the first digital rights management protection policy and the first key is received at the client device in a separate communication transmitted by the media server device out of band with respect to the digital-content stream and preceding transmission of the first portion of the digital-content stream from the media server device to the client device.

14. The computer-readable storage medium of claim 9 wherein the client device is coupled to the media server device within a local-area network.

15. In a media server device coupled to a rendering device and operable to receive a digital-content stream, a method comprising:
receiving, at the media server device, a digital-content stream to be provided to the rendering device;
providing a first portion of the digital-content stream from the media server device to a buffer of the rendering device, the first portion of the digital-content stream to be output at the rendering device in accordance with a first digital rights management protection policy;
receiving, at the media server device, an identifier indicating that a second digital rights management protection policy is to be applied to a forthcoming second portion of the digital-content stream that is to be provided to the rendering device for restricting redistribution of the second portion of the digital-content stream;
creating, at the media server device, a license data set including the second digital rights management protection policy and a key for enabling decryption of the second portion of the digital-content stream;
transmitting, from the media server device to the rendering device, the license data set and an indicator indicating commencement point of the digital-content stream at which the license data set is to be employed, the license data set being transmitted from the media server device in a separate communication out of band with respect to the digital-content stream concurrently with providing the first portion of the digital-content stream to the rendering device and preceding transmission of the second portion of the digital-content stream from the media server device to the rendering device;
receiving, at the media server device, confirmation from the rendering device that the rendering device is enabled to enforce the second digital rights management protection policy for the second portion of the digital-content stream;
encrypting, at the media server device, the second portion of the digital-content stream using the key; and
providing the encrypted second portion of the digital-content stream from the media server device to the buffer of the rendering device while at least some of the first portion of the data steam is remaining in the buffer of the rendering device.

16. The method of claim 15 further comprising providing, from the media server device to the rendering device, a license data set comprising the first digital rights management protection policy and a key for enabling decryption of the first portion of the digital-content stream.

17. The method of claim 15 wherein the license data set comprising the first digital rights management protection policy is provided to the rendering device in a separate communication transmitted by the media server device out of band with respect to the digital-content stream and preceding transmission of the first portion of the digital-content stream from the media server device to the rendering device.

18. The method of claim 15 wherein providing the digital-content stream comprises wirelessly transmitting the digital-content stream from the media server device to the rendering device.

19. The method of claim 15 wherein the digital-content stream comprises a television digital-content stream, and the identifier of the second digital rights management protection policy received at the media server device is included in the television-content stream.

20. A computer-readable storage medium that does not consist of a signal, the computer-readable storage medium storing computer-executable instructions causing a computer to perform the steps recited in claim 15.

* * * * *